United States Patent [19]
Matsumoto

[11] Patent Number: 6,025,934
[45] Date of Patent: Feb. 15, 2000

[54] IMAGE PROCESSING APPARATUS

[75] Inventor: Nobuo Matsumoto, Kanagawa, Japan

[73] Assignee: Fuji Photo Film Co., Ltd., Kanagawa-ken, Japan

[21] Appl. No.: 08/893,040

[22] Filed: Jul. 15, 1997

[30] Foreign Application Priority Data

Jul. 18, 1996 [JP] Japan .................................. 8-189519

[51] Int. Cl.[7] .................................................. H04N 1/04
[52] U.S. Cl. .......................................... 358/474; 358/487
[58] Field of Search ..................................... 358/404, 408, 358/444, 468, 506, 487, 474, 505; 382/318; 352/79, 80, 82, 83; 353/26 R, 27 R, 26 A, 27 A, 25; H04N 1/00, 1/04

[56] References Cited

U.S. PATENT DOCUMENTS

| | | | |
|---|---|---|---|
| 4,797,706 | 1/1989 | Sugishima et al. | 355/14 R |
| 5,159,385 | 10/1992 | Imamura | 358/28 |
| 5,572,633 | 11/1996 | Lo et al. | 395/117 |

*Primary Examiner*—Kim Yen Vu
*Attorney, Agent, or Firm*—Sughrue, Mion, Zinn, Macpeak & Seas, PLLC

[57] ABSTRACT

An image processing apparatus which is equipped with a printer in which a plurality of original images recorded in an elongated member is recorded on a recording material, comprising: a plurality of image readers which can read, as image data, the plurality of original images, respectively; a plurality of memories provided such that at least one memory corresponds to each of the plurality of image readers, the plurality of memories each storing temporarily the image data read by a corresponding image reader; image-data selection/readout means which selects and reads out the image data from the plurality of memories in accordance with a predetermined order irrespective of an order of the image data being read by the plurality of image readers; an image data supply controller which supplies, for the printer, the image data read out by the image-data selection/readout means; and a distributor which distributes, in a previously set order, recording materials printed by the printer based on the supplied image data. As a result, the printed recording materials are distributed appropriately as occasion demands.

20 Claims, 6 Drawing Sheets

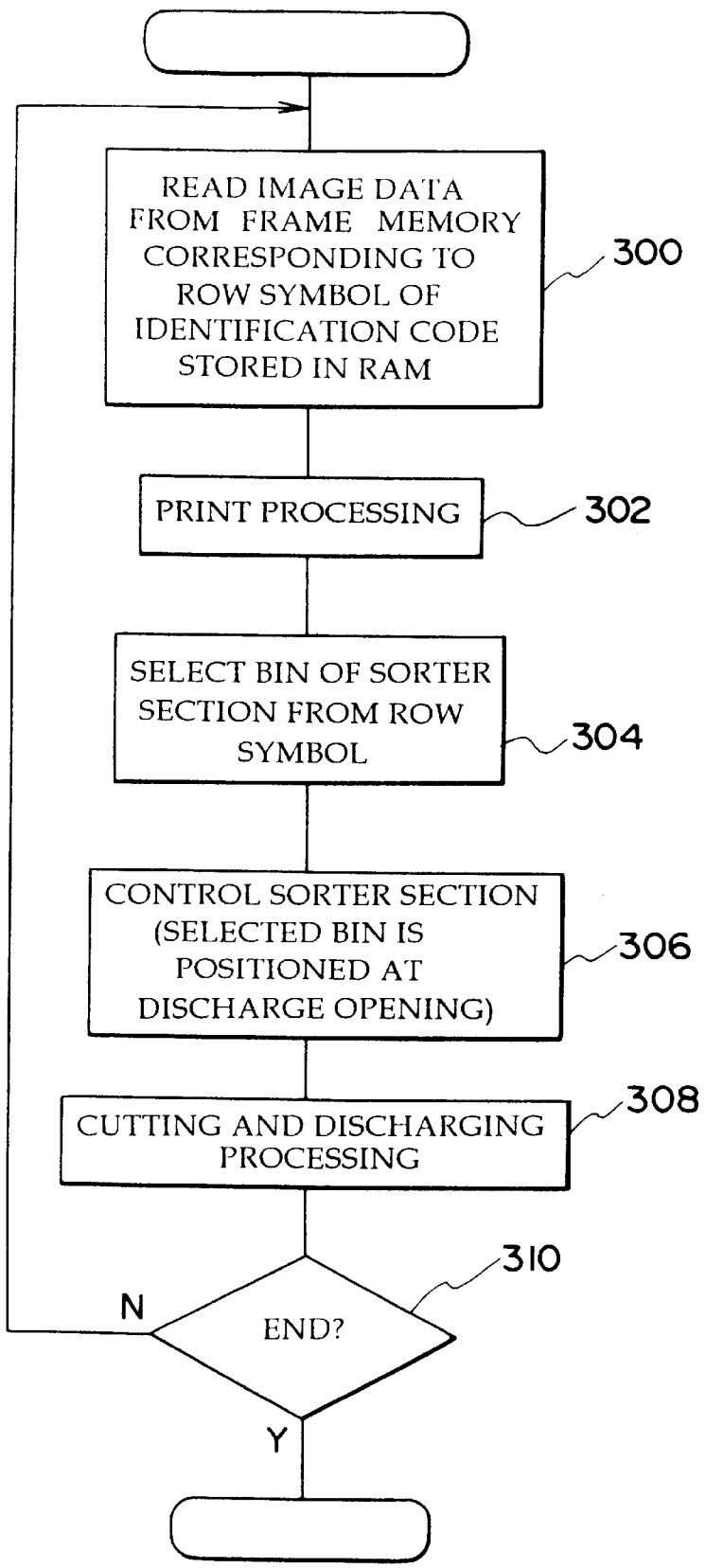

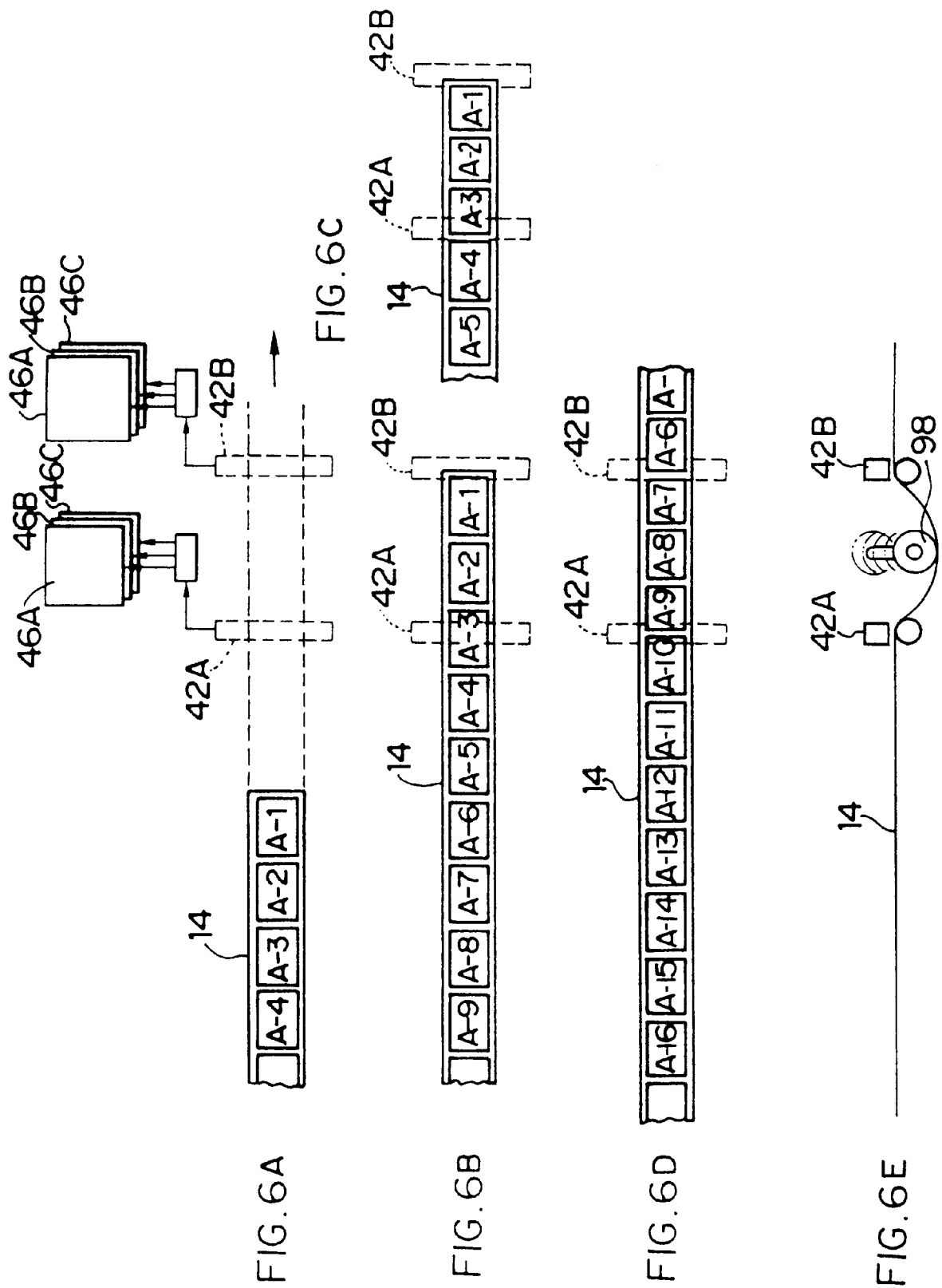

IMAGE PROCESSING APPARATUS

BACKGROUND OF THE INVENTION

1. Field of the Invention

The present invention relates to an image processing apparatus which is equipped with a printer in which original images continuously recorded in an elongated member are recorded on a recording paper.

2. Description of the Related Art

Conventionally, there has been known, for example, a digital image printer in which image reading means such as a line sensor is disposed at an end portion of a developing machine at the downstream side in a conveying direction of a negative film on which images are recorded and which is conveyed in a line, the images recorded on the negative film are read in digital form, necessary image processing or correction is effected on the basis of the read image data, and the image data is supplied for the printer, in which, in turn, the image data is printed. Meanwhile, there also exists a developing machine in which negative films arranged in multiple rows are simultaneously subjected to development processing. In this case, one image reading means is usually provided in the developing machine, and therefore, during reading of images of one negative film, other negative films are set in a standby state.

In the above-described digital image printer, a read rate of the image reading means gives a large contribution to the entire processing of the printer. Further, the read rate is influenced by a quantity of light from a light source, the light being transmitted through the negative film to allow formation of an image at a reading position in the image reading means.

Accordingly, when the quantity of light is reduced, it is necessary to decrease the reading rate, which is not suitable for large volume processing. On the other hand, when the quantity of light is increased, reduction of a reading time can be achieved, which is suitable for the large volume processing.

However, when the quantity of light is increased, not only the apparatus becomes larger, but also an electric capacity thereof must be increased correspondingly. Further, an increase in the number of parts leads to an increase in cost.

Basically, one image reading means is provided for a negative film conveyed in an elongated manner (in this case, one negative film may be conveyed, or a plurality of connected negative films may be conveyed), images recorded on the negative film are read in order as recorded, and the read image data are sequentially supplied for a printer.

Here, so long as the number of image reading means is increased and images are read by a plurality of image reading means substantially concurrently, the reading time can substantially be reduced. At this time, when the negative films are conveyed in multiple rows, an arrangement in which one image reading means is provided for each row should be also included.

However, when images are read by the plurality of image reading means as described above, the order of the images as read becomes disturbed. Namely, the order of the images being printed by the printer, or the order of printout becomes different from the order of the images as recorded on the negative film.

As a result, images of negative films whose development processing is ordered by a plurality of customers are brought into a disordered state and a subsequent distribution operation becomes complicated. For this reason, the operating efficiency deteriorates.

SUMMARY OF THE INVENTION

In view of the above-described circumstances, it is an object of the present invention to provide an image processing apparatus in which image data read by a plurality of image data reading means can be distributed in accordance with a desired order, thereby resulting in improvement of the operating efficiency.

A first aspect of the present invention is an image processing apparatus which is equipped with a printer in which a plurality of original images recorded in an elongated member is recorded on a recording material, comprising: a plurality of image readers which can read, as image data, the plurality of original images, respectively; a plurality of memories provided such that at least one memory corresponds to each of the plurality of image readers, the plurality of memories each storing temporarily the image data read by a corresponding image reader; image-data selection/readout means which selects one of the plurality of memories in accordance with a predetermined order irrespective of an order of the image data being read by the plurality of image readers and reads out the image data from the selected memory; an image data supply controller which supplies, for the printer, the image data read out by the image-data selection/readout means; and a distributor which distributes, in a previously set order, recording materials printed by the printer based on the supplied image data.

In accordance with the above-described first aspect, the plurality of image readers is provided so as to be able to read a plurality of original images substantially concurrently and the image which is read, as the image data, by each of the image readers is stored in a corresponding memory among the plurality of memories.

The image-data selection/readout means is provided to select one of the plurality of memories in accordance with the predetermined order irrespective of the order of the images being read by the image readers, and read out the image data from the selected memory.

The read image data is supplied for the printer by the image data supply controller and is printed on a recording paper. The recording papers discharged by the printer in the order as printed is distributed by the distributor in accordance with a predetermined rotation.

As a result, for example, in a case in which the image data is printed out in the same order as that of the original images as recorded in the elongated member, even if there is a possibility that the image data cannot be read by the plurality of image readers in regular order, the recording papers can be reliably distributed in a desired order.

A second aspect of the present invention is constructed such that, in the above-described first aspect, the image-data selection/readout means is provided to select one of the plurality of memories on the basis of case information for specifying the elongated member and read out the image data from the selected memory, and the distributor is provided to distribute the printed recording materials for each case.

In accordance with the above-described second aspect, the case information is information for specifying a corresponding elongated member, for example, case information in which elongated-member ID information recorded on the elongated member and one customer are taken as the unit. Accordingly, when customer information is managed, a case in which processing for a plurality of elongated members (for example, negative films) is requested by an identical customer can also be handled as an identical case. By distributing the recording papers on the basis of the above-described information, operating efficiency of postprocessing (for example, return processing) can be improved.

A third aspect of the present invention is constructed such that, in the above-described first aspect, the image-data selection/readout means selects, on the basis of row information which specifies each of rows of the plurality of image readers, one of the plurality of memories and reads out the image data from the selected memory, and the distributor is provided to distribute the printed recording materials for each of the rows on the basis of the row information.

In accordance with the above-described third aspect, when the elongated members are processed concurrently, it suffices that original images of the elongated members being processed concurrently are processed alternately (in accordance with a predetermined rule). However, when there is a possibility that the original images in the same row are continuously read, the order of the recording papers being discharged from the printer becomes disturbed. Accordingly, on the basis of row information of the plurality of image readers provided for each of rows, the image data are selected and read out. As a result, in the distributor in which the recording papers are printed alternately for each of the rows, the recording papers can be distributed for each of the rows.

A fourth aspect of the present invention is constructed such that, in the above-described first aspect, the plurality of image readers are disposed substantially in a straight line along a longitudinal direction of the elongated member conveyed in a row, and the image-data selection/readout means selects, every time reading of one image data by any one of the plurality of image readers is completed, a memory corresponding to the any one of the image readers, and reads out the one image data from the selected memory.

In accordance with the above-described fourth aspect, when the elongated members are processed in one row, the plurality of image readers is provided along the longitudinal direction thereof, i.e., the direction in which the elongated members are conveyed. Here, the image reading time varies in accordance with the states of images (hue, density, and the like), and therefore, assuming that the order of the image data being read by the image-data selection/readout means is, for example, previously determined in an alternate manner, the memory capacity of one memory must be provided such that the plurality of image data can be stored therein. Accordingly, so long as the image data are read out by the image-data selection/readout means sequentially from the image data for which reading is first completed, it suffices that the memory has a minimum memory capacity, for example, a memory capacity which allows storage of image data of one original image.

A fifth aspect of the present invention is constructed such that, in any one of the above-described first to fourth aspects, the distributor is provided to distribute the printed recording materials in an order of the plurality of original images being recorded in the elongated member.

In accordance with the above-described fifth aspect, the image data are read by the image-data selection/readout means sequentially from the image data for which reading is first completed, and are printed on the recording papers in the same order. When the recording papers are discharged in such a state as they are, there is a possibility that the recording papers are not discharged in the order of the image data being recorded in the elongated members. Accordingly, the printed recording papers are distributed by the distributor in the order of the image data being recorded in the elongated members, and therefore, the operating efficiency of subsequent processing can be improved.

A sixth aspect of the present invention is constructed such that, in the above-described first aspect, the plurality of image readers are disposed substantially in a straight line along a longitudinal direction of the elongated member and are provided to be able to read, as the image data, the original images of which number corresponds to at most the number of the plurality of image readers substantially simultaneously, and the image-data selection/readout means is provided to select one memory, corresponding to an order of the plurality of original images being recorded on the elongated member, from the plurality of memories, and reads out the image data from the selected memory.

In accordance with the above-described sixth aspect, the image-data selection/readout means is provided to read out the image data in the order as recorded in the elongated members irrespective of the order of the images being read by the image readers. As a result, when the printed recording materials are distributed by the distributor, it suffices that the printed recording materials be discharged in the order as printed.

A seventh aspect of the present invention is constructed such that, in the above-described first aspect, the plurality of image readers are disposed in such a manner that one of the image readers corresponds to each of the plurality of rows so that the plurality of elongated members can be processed in the plurality of rows, and the image-data selection/readout means selects, in an order of reading of any one of the plurality of original images by any one of the plurality of image readers being completed, a memory corresponding to the one image reader from the plurality of memories, and reads out the image data from the selected memory.

In accordance with the above-described seventh aspect, when the elongated members provided in a plurality of rows are processed concurrently, one image reader is disposed for each of the rows of elongated members. Here, the image reading time varies in accordance with the states of images (hue, density, and the like), and therefore, assuming that the order of the image data being read by the image-data selection/readout means is, for example, previously determined in an alternate manner, the memory capacity of the memory must be provided such that the plurality of image data (data of a plurality of original images) can be stored therein. Accordingly, so long as the image data are read out by the image-data selection/readout means sequentially from the image data for which reading is first completed, it suffices that the memory has a minimum memory capacity.

An eighth aspect of the present invention is constructed such that, in the above-described seventh aspect, the distributor is provided to distribute the printed recording materials for each of the plurality of rows.

In accordance with the above-described eighth aspect, when the elongated members provided in a plurality of rows are processed concurrently, so long as the printed recording materials are distributed by the distributor for each of the rows, the operating efficiency of subsequent processing can be improved.

A ninth aspect of the present invention is constructed such that, in the above-described seventh aspect, the printer is provided to correspond to each of the plurality of rows and the elongated member is printed by a corresponding printer among the printers respectively provided for the plurality of rows.

In accordance with the above-described ninth aspect, the printer is provided for each of the rows of elongated members and the recording papers are distributed by considering only the order of the images being read by the image readers which are each provided for each of the rows. Accordingly, the printed recording papers can be discharged independently for each of the rows in the order of the plurality of original images being recorded in the elongated members.

BRIEF DESCRIPTION OF THE DRAWINGS

FIG. 5 is a flowchart showing positioning control of bins in a sorter section.

FIGS. 6A through 6E each show an image reading device according to a second embodiment of the present invention: FIG. 6A is a plan view showing a state in which CCD line sensors are disposed; FIG. 6B is a plan view showing a state in which a negative film is conveyed to a read start position; FIG. 6C is a plan view showing a position of the negative film when two CCD line sensors are both brought into a readable state; FIG. 6D is a plan view showing the vicinities of the CCD line sensors during reading of images; and FIG. 6E is a side view showing a state in which a slack portion is formed in a negative film by a dancer roller.

DESCRIPTION OF THE PREFERRED EMBODIMENTS

[First Embodiment]

Figure 1:
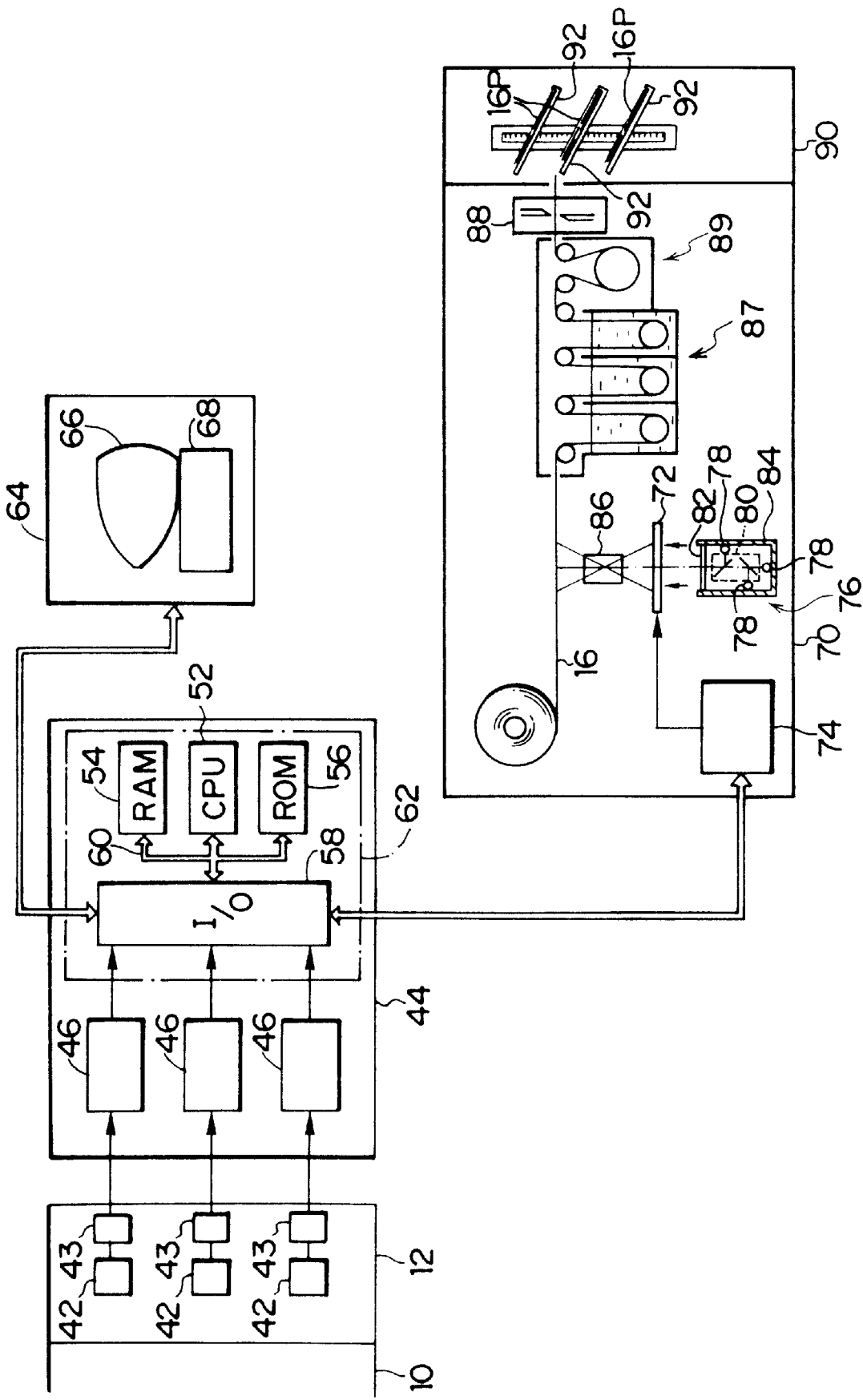
FIG. 1 is an overall schematic diagram of a photographic processing system according to a first embodiment of the present invention.
Figure 2:
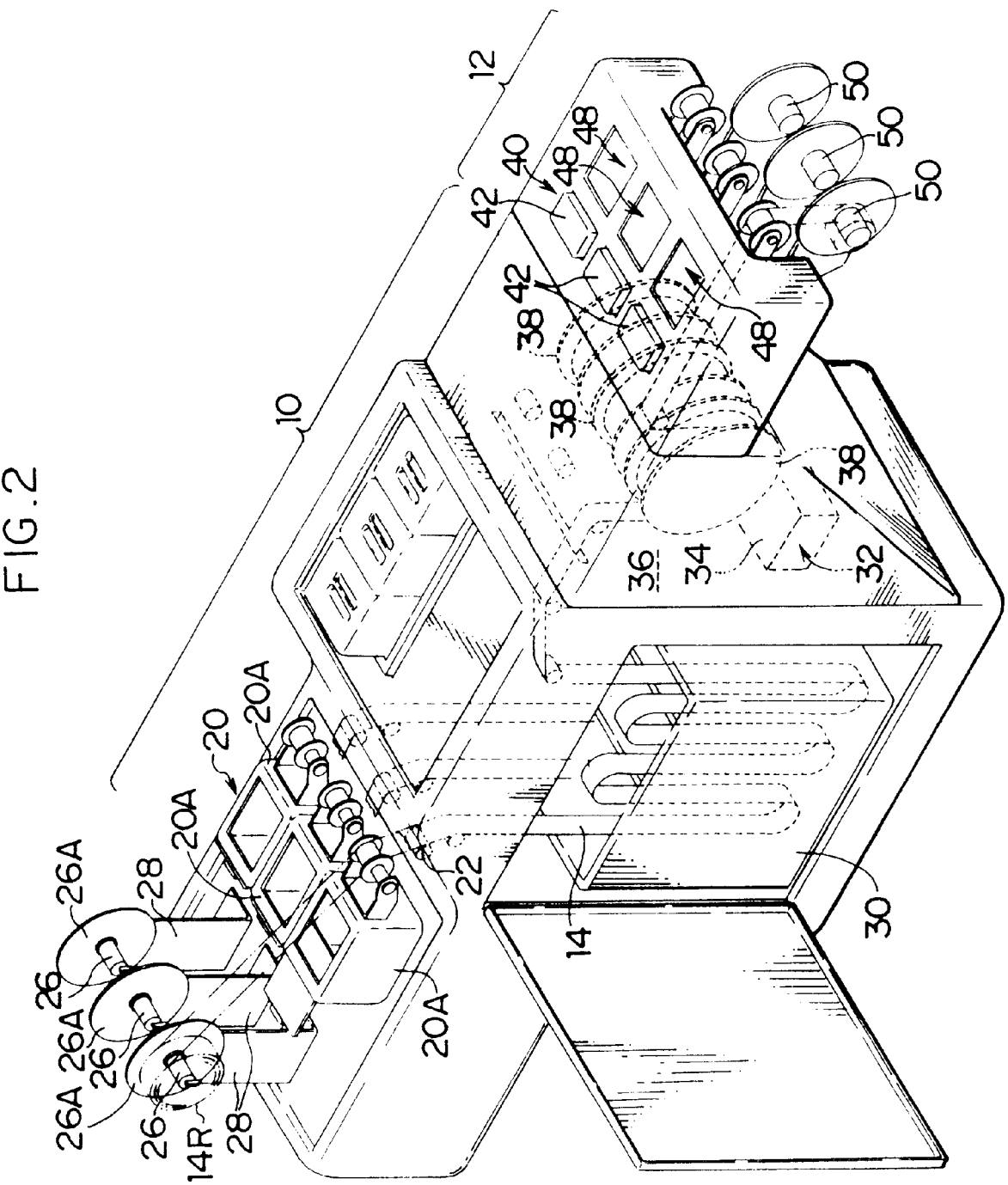
FIG. 2 is a partial perspective view of a developing device and a printing device according to the first embodiment of the present invention.
Figure 3:
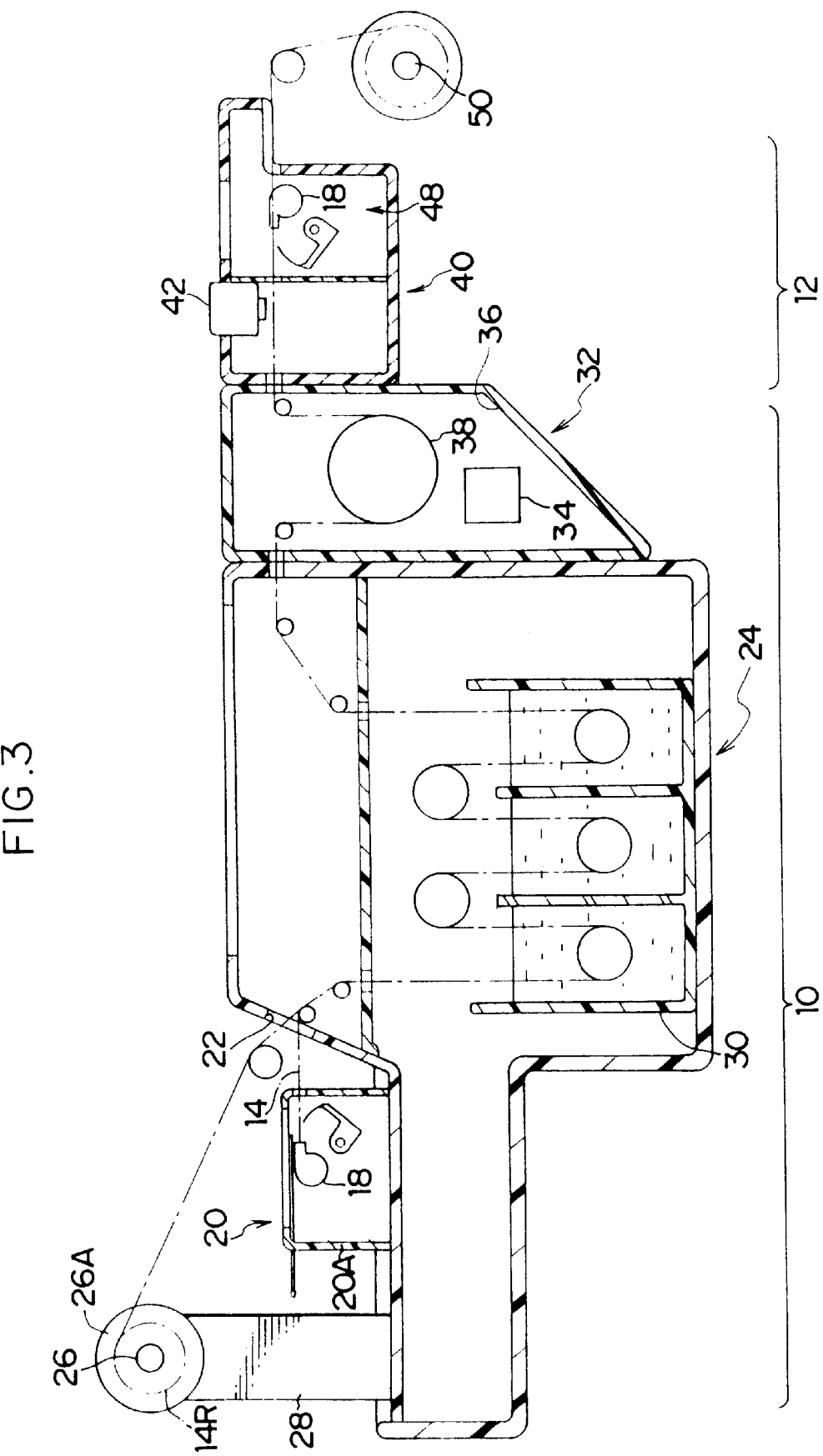
FIG. 3 is a schematic diagram showing respective partial inner structures of the developing device and the printing device according to the first embodiment of the present invention.

FIGS. 1 through 3 each show a schematic diagram of a photographic processing system according to a first embodiment of the present invention.

The photographic processing system includes a developing device 10 (see FIGS. 2 and 3) for developing a negative film photographed by a camera (not shown) or the like. When the negative film is subjected to development processing by the developing device 10, images recorded (photographed) on the negative film are developed to be rendered visible.

As shown in FIGS. 2 and 3, a reading device 12 is disposed at a downstream side of the developing device 10. A developed negative film 14 is mounted in the reading device 12 so that images recorded on the negative film 14 are formed on and read by CCD sensors.

The developing device 10 is provided with a loading portion 20 for loading a cartridge 18 (see FIG. 3), in which the photographed negative film 14 is accommodated, at an utmost upstream side of the developing device 10. The loading portion 20 includes three cartridge positioning portions 20A. Namely, the cartridge 18 can be loaded in each of the cartridge positioning portions 20A, and the cartridge positioning portions 20A are each provided to independently pull out the negative film 14 from the cartridge 18 and convey the negative film 14 thus pulled out, from an insertion opening 22 to a development section 24. Meanwhile, the loading portion 20 is provided to be applied when, in a case of processing a relatively small volume of negative films 14, the negative film 14 is processed one by one in such a manner that one cartridge 18 is loaded in each of the positioning portions 20A (the loading portion 20 will be hereinafter referred to as a "small-volume-processing loading portion 20").

Three reel mounting shafts 26 are provided upright in the vicinities of the small-volume-processing loading portion 20 via stays 28, respectively.

A flange 26A is mounted at one end portion (the base portion) of each of the reel mounting shafts 26 and a roll film 14R formed with a plurality of negative films 14 being connected in an elongated manner can be mounted onto each of the reel mounting shafts 26. The plurality of negative films of the roll film 14R can be conveyed into the development section 24 sequentially from the outermost negative film. These reel mounting shafts 26 are applied to a case in which a relatively large volume of negative films is processed. In this case, a plurality of negative films 14 can be continuously processed.

The development section 24 includes various processing tanks 30 formed from a developing tank, a bleach-fix tank, a washing tank, and the like. These processing tanks are filled with a developing solution, a bleach-fix solution, washing water, and the like, respectively.

A processing rack (not shown) is disposed in each of the processing tanks 30 and is provided to apply conveying force to the negative film 14 and have function of guiding the negative film 14 in a direction in which the film is conveyed. The processing rack of the present embodiment includes guide grooves for guiding transverse-direction end portions of the negative film 14. The negative film 14 is conveyed in each of the processing tanks 30 to form a substantially U-shaped configuration while being guided by the guide grooves. Further, the negative film 14 is conveyed from a processing tank 30 to an adjacent one by being guided by a cross-over rack (not shown). As a result, the negative film 14 inserted from the insertion opening 22 is automatically conveyed in each of the processing tanks 30 substantially in U-shaped form and is thereafter conveyed to a drying section 32.

The drying section 32 includes a chamber 36 whose atmosphere is heated to a predetermined temperature by a heat source 34. The negative film 14 is dried so as to pass through the chamber 36 while being entrained onto a drum 38, and is thereafter discharged from the drying section 32. Meanwhile, as occasion demands, hot air may be forcedly applied to the negative film 14 by a fan or the like, or the negative film 14 may be dried in such a manner as to be directly wound around a heat roller (which is formed by providing a heat source within the dram 38). Moreover, the above-described methods may be used together.

When the negative film 14 discharged from an exhaust opening allows the images thereof to be rendered visible in a completely dried state, and subsequently, the negative film 14 is sent out to a next image reading section 40 which forms a part of the reading device 12.

The image reading section 40 includes three CCD line sensors 42 which are respectively provided along three conveying paths of the negative films 14, and is constructed to read images due to the negative films 14 each passing through the CCD line sensor 42. The read images are temporarily stored in a frame memory 43.

The negative film 14 after images thereof have been read by the image reading section 40 is accommodated again in the cartridge 18 loaded in an empty cartridge loading portion 48 or is wound onto a reel 50 in accordance with small volume processing or large volume processing, namely, single film processing or continuous processing of a plurality of connected films.

As shown in FIG. 1, the read images are sequentially recorded on the frame memory 43, and subsequently, are stored in a frame memory 46 within a controller 44, the frame memory 46 being provided to correspond to the CCD line sensor 42 thereof. The frame memory 46 has a memory capacity that data of one image read by the CCD line sensor 42 can be stored.

The controller 44 includes a microcomputer 62 which is formed by CPU 52, RAM 54, ROM 56, input-output port 58, and a bus 60 such as a data bus, a control bus, and the like, which is provided to connect the above components. An image processing apparatus 64 is connected to the input-output port 58. The image processing apparatus 64 is formed by a monitor 66 which takes in and displays images read by the CCD line sensor 42, and an operating portion 68 for effecting various image processing (hue adjustment, density adjustment, superimposition, and the like) on the basis of images displayed on the monitor 66. The images processed in the image processing section 64 are stored in the frame memory 46.

Meanwhile, in the image processing section 64, with a program being previously arranged, density adjustment, entry of characters indicating a date, a photographing place, and the like may be automatically effected.

The images recorded in each of the frame memories 46 are selectively read out by control of the microcomputer 62 and conveyed to a print section 70.

The print section 70 is provided with a liquid crystal panel 72. When an image signal is transferred via a print section driving/controlling portion 74, an image for each of three primary colors is displayed on the liquid crystal panel 72.

A light source section 76 is provided at a rear-surface side of the liquid crystal panel 72. The light source section 76 is mounted on the liquid crystal panel 72 in such a manner that LEDs 78 which respectively emit light of colors of red, blue, and green, a dichroic mirror 80 for causing respective optical axes of light beams emitting from the LEDs 78 to be made coaxial, and a lens 82 by which light beams are made into parallel light beams are accommodated in a case 84. For this reason, parallel light beams are irradiated on the liquid crystal panel 72 for each of the colors so that images corresponding to the colors are sequentially displayed on the liquid crystal panel 72. Light beams transmitted through the liquid crystal panel 72 are provided to form an image on a photographic printing paper 16 via an image forming optical system 86. At this time, with images of the three colors being exposed in a superimposed manner, a color image can be obtained.

Further, the print section 70 includes a development section 87 for effecting development processing for the photographic printing paper 16 onto which an image is exposed, and a drying section 89 for effecting drying processing for the developed photographic printing paper 16. The development section 87 is provided with a development tank in which a development solution is filled, a bleach-fix tank in which a bleach-fix solution is filled, and a washing tank in which washing water is filled.

As described above, the print-exposed photographic printing paper 16 is sequentially conveyed to the developing section 87 and to the drying section 89 and is cut by a cutter section 88 for each of the images (a printing paper cut off for each of the images will be hereinafter referred to as a "printing paper print 16P), and thereafter, separate printing papers are conveyed to the sorter section 90.

The sorter section 90 includes bins 92L respectively provided at three stages, and on the basis of row information of three negative films processed concurrently, the printing paper prints 16P are distributed.

For example, assuming that, in order to differentiate the negative films conveyed in three rows, the three bins 92 are given as stage A, stage B, and stage C sequentially from the uppermost bin 92 on the paper of FIG. 1 and the three conveying paths of negative films are given as row A, row B, and row C sequentially from the conveying path as shown toward the front in FIG. 2, no problem is caused so long as reading of images using the CCD line sensors 42 is effected in the order of row A, row B, and row C. However, practically, this reading order may be disturbed due to the states of the images (for example, the densities thereof). Namely, when reading of the images is effected in such a disturbed manner as in the order of A-1 (the figure "1" indicates an image frame number), B-1, C-1, B-2, A-2, and C-2, the images cannot be distributed for each of the bins 92. In the present embodiment, by controlling distribution (i.e., selection of the bin 92) of the sorter section 90 on the basis of information of each row, the images are distributed for each row. The row information may be obtained by simultaneously reading the information recorded on the negative film 14, or may also be obtained with an individual ID or the like specified in the CCD line sensor 42 being stored together with image data.

Next, an operation of the present embodiment will be described.

First, in the developing device 10, the negative film 14 on which images have already been recorded by a camera or the like is loaded, together with the cartridge, in the positioning portion 20A of the loading portion 20 or the plurality of negative films 14 previously connected together is mounted onto the reel mounting shaft 26.

In either cases, the pulled-out negative film 14 passes through the insertion opening 22 and is conveyed to the development section 24. In the development section 24, the negative film 14 is, while being guided by the processing racks and the crossover racks, conveyed within the processing tanks 30 for development processing, bleach-fix processing, and washing processing so as to have a substantially U-shaped configuration, and thereafter, the negative film 14 subjected to various processing is sent out to the drying section 32. The drying section 32 includes the drum 38. The negative film 14 passes through the chamber 36 of the drying section 32 while being entrained onto the drum 38. At this time, the interior of the chamber 36 is maintained at a predetermined temperature by the heat source 34, and therefore, the negative film 14 to which water is applied after having been subjected to various processing using the processing solutions is gradually dried in the chamber 36 and is conveyed to the image reading section 40 in a completely dried state.

In the image reading section 40, images on the negative films 14 subjected to development processing are sequentially read by the CCD sensor 42. At this time, read resolution provided by the CCD line sensor is automatically determined due to the kind, density, and the like, of an image, and in accordance with the read resolution, the conveying speed of the negative film 14 is varied. Accordingly, the respective read rates of three rows of negative films 14 are different from each other in an image reading step, and although images of the same size are recorded on the negative films 14, an unexposed image frame may exist. For this reason, image reading processing for each of all rows of negative films is not necessarily completed simultaneously.

Accordingly, at the time of image reading, the controller 44 allows, for each image, setting of an identification code for specifying the image to be read and stored in each frame memory 46. The simplest identification code is formed from a combination of a row symbol and a consecutive number of an image of the film 14. As an example, in row A, images are arranged in order as read, namely, in the order of A-1, A-2 . . . and are stored in such a manner as to be held in order as recorded on each frame memory 46. As a result, there may be a case in which images are stored regularly in the frame memory 46 as in the order of A-1, B-1, C-1, A-2, B-2, C-2, A-3, . . . (example 1), or there also may be a case in which images are stored in such a random order as in the order of A-1, B-1, A-2, C-1, C-2, B-2, A-3, . . . (example 2). It suffices that the identification code is stored in RAM 54 of the microcomputer 62 within the controller 44. Meanwhile, the procedure for storing the identification code will be described later in detail with reference to the flowchart shown in FIG. 4.

The negative film 14 after completion of image reading processing is accommodated again in the cartridge 18 or is accommodated to be wound onto the reel 50 in accordance with the processing form of the negative film 14 (i.e., single film processing or connected multiple film processing). Namely, when the negative film 14 is pulled out from the cartridge 18 mounted at the positioning portion 20A and is subjected to development processing, the cartridge 18 within the positioning portion 20A, which is brought into an empty state, is moved to an empty cartridge loading portion 48 during development processing and image reading processing of the negative film 14 and the negative film 14 is accommodated again in the cartridge 18.

On the other hand, the negative film 14 pulled out from the reel mounting shaft 26 and subjected to development processing is accommodated to be wound onto the reel 50.

Figure 4:
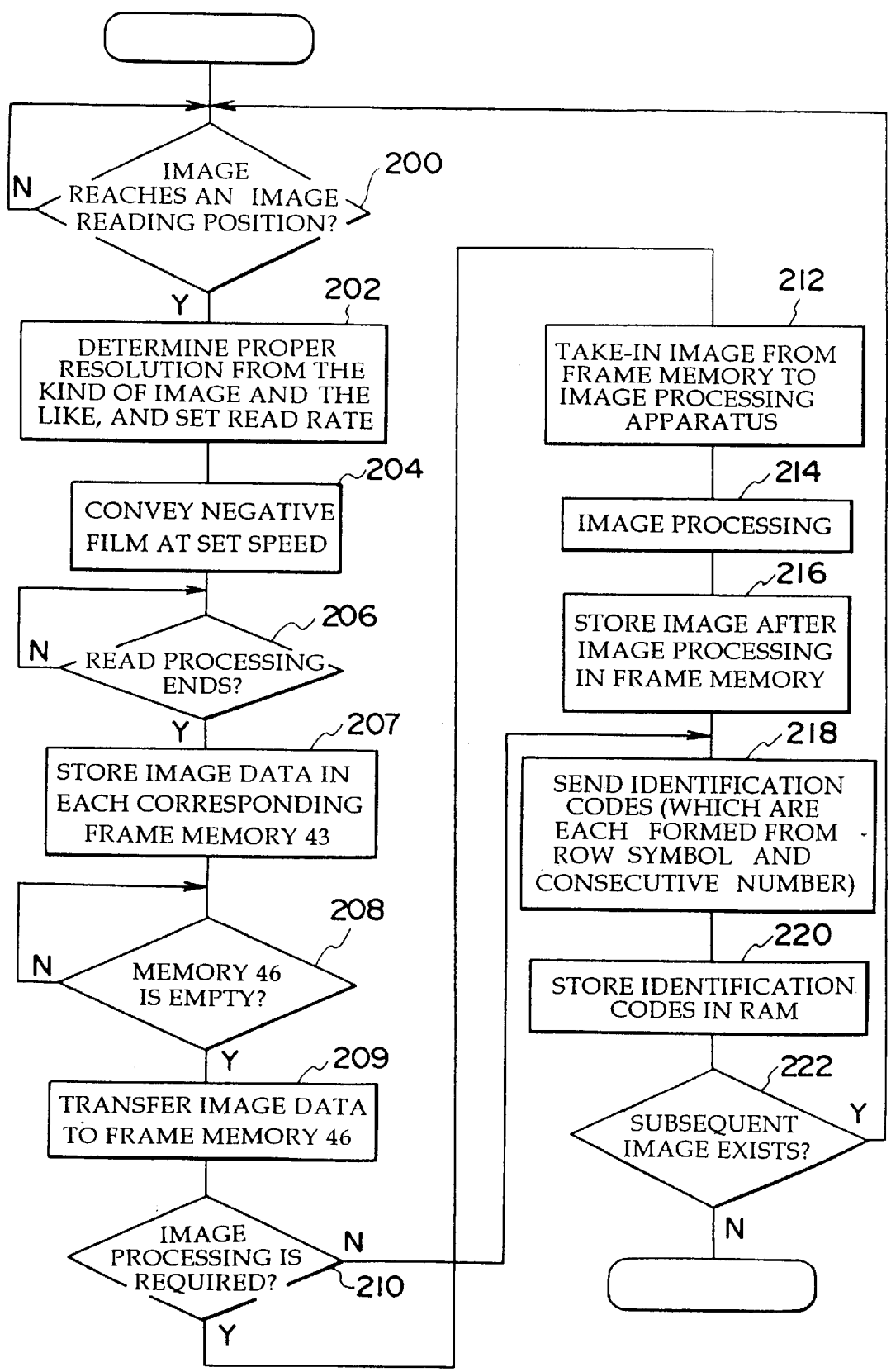
FIG. 4 is a control flowchart showing an image reading procedure.

Next, with reference to the flowcharts shown in FIGS. 4 and 5, the printing procedure of images recorded on each frame memory 46 will be described together with the image reading procedure described above.

First, with reference to the flow chart shown in FIG. 4, the process from image reading processing by the CCD line sensors 42, which are provided in the rows of negative films, to storage processing of images in the frame memory 46 provided in each of the rows will be described. It should be noted that this operation is effected independently for each of the rows of negative films.

In step 200, it is determined whether or not an image reaches an image reading position. When the decision of step 200 is yes, the process proceeds to step 202, in which a proper resolution is automatically determined from the kind of image. In this case, a specified resolution may be set. When the resolution is determined, the conveying speed of the negative film 14 is set to correspond to the determined resolution, and the process proceeds to step 204.

In step 204, constant-speed conveying of the negative film 14 is effected at a set speed. In this case, the difference between this set speed and the conveying speed during development processing is controlled only by providing a reservoir section, in which the negative film 14 can be reserved, between the drying section 32 and the image reading section 40. Further, with the conveying speed of the negative film 14 being set at a fixed value, the read rate of the CCD line sensor 42 in the main scanning direction may be controlled or a time interval to a sub-scanning time may be controlled.

In the subsequent step 206, it is determined whether or not reading processing has been completed. When the decision of step 206 is yes, the process proceeds to step 207, in which image data read in the frame memories 43 provided to respectively correspond to the rows are stored. Further, when the frame memory 46 is empty, the image data are subsequently transferred to the frame memory 46 (steps 208 and 209).

Next, in step 210, it is determined whether or not image processing for images stored in the frame memory 46 is required. When the decision of step 210 is yes, the process proceeds to step 212, in which the image data stored in the frame memory 46 are transferred to the image processing apparatus 64.

In the subsequent step 214, the image data taken in the image processing apparatus 64 is subjected to image processing. For example, at the time of the image processing, density adjustment, trimming, and input of characters ordered by a customer are effected, and the process proceeds to step 216. In step 216, the processed image data are stored again in the frame memory 46, and the process proceeds to step 218. Meanwhile, in step 210, when it is determined that the image processing is not required, the process proceeds to step 218 skipping over steps 212, 214, and 216. The respective processing speeds of the rows of negative films are different from each other depending upon whether the image processing is required or not.

In step 218, the identification code formed from the row symbol and the consecutive number of a currently-processed image is set and sent out. In step 220, identification codes are stored in RAM 54 in order as sent out. Namely, the above-described processing is effected each for three rows of negative films concurrently, and therefore, it is not possible to previously understand from which row an identification code is sent out. Accordingly, there is a possibility that storage of image data is effected in such a disturbed order as in example 2 without being effected regularly as in example 1.

A plurality of identification codes is sequentially registered in RAM 54. However, since the frame memory 46 has a memory capacity of one image and printing processing, described later, is effected simultaneously, printing processing may be effected in the order of the identification codes being sent out without the identification codes being stored in RAM 54 every time.

In the next step 222, it is determined whether or not a subsequent image exists. When the decision of step 222 is yes, the process proceeds to step 200. Further, when the decision of step 222 is no, the routine ends.

Next, with reference to the flowchart shown in FIG. 5, the printing procedure (including distribution) based on the image data recorded on the frame memory 46 will be described.

First, in step 300, the identification codes (which are each formed from the row symbol and the consecutive number) are read out in order as stored in RAM 54 and image data is read out from the frame memory 46 corresponding to the row symbol.

Next, in step 302, print processing is executed on the basis of the read image data. Namely, by controlling a print section controlling section 74, an image of the first color is displayed on the liquid crystal panel 72 and an LED 78 corresponding to the first color is turned on. When parallel light beams of the first color from the light source portion 76 reach and are transmitted through the liquid crystal panel 72, the image displayed on the liquid crystal panel 72 is formed and exposed on the photographic printing paper 16 by the image forming optical system 86. After a predetermined time has elapsed, with the second color and the third color being sequentially displayed on the liquid crystal panel 72 and the LED 78 corresponding to the second color or the third color being turned on, the printing-exposure processing is effected. As a result, a color image is exposed, as a latent image, onto the photographic printing paper 16. When the above-described operation is effected repeatedly, latent images are continuously recorded on the photographic printing paper 16.

The exposed image is rendered visible by being subjected to development processing, bleach-fix processing, and washing processing. Thereafter, the printing paper on which the images are recorded is dried, and is further conveyed to the cutter section 88. In the cutter section 88, the printing paper is cut for each of the images so that the printing paper prints 16P are prepared.

Here, in order to understand to which row in the developing device 10 the printing paper prints 16P belong to, step 304 determines the row to which the printing paper prints belong on the basis of the row symbol of the identification code read in step 300. In step 306, on the basis of the row information determined in step 304, the bin 92 of the sorter section 90 is moved to be positioned at a predetermined location.

In step 308, the printing paper prints 16P cut by the cutter section 88 are guided to each of the bins 92. As a result, even if the order of images being read becomes disturbed, the printing paper prints 16P for each row in the developing device 10 are distributed for each of the three bins 92.

The above-described first embodiment is constructed such that during reading of image data the reading order is corrected. However, there may also be used a method in which the image data is read and printed in order as read, the identification codes for the image data are detected after printing, setting of the bins 92 is effected, and the sorter section 90 is thereby controlled.

[Second Embodiment]

In the above-described first embodiment, distribution processing is effected in such a manner that one CCD line sensor 42 is disposed for each of the rows and the order of images as read by each CCD line sensor 42 is managed based on the identification code. However, in the same device configuration, as shown in FIG. 6, a plurality of CCD line sensors 42A, 42B (in the second embodiment, two sensors) may be provided for each row.

The device configuration according to the second embodiment is different from that of the first embodiment in that, as shown in FIGS. 6A through 6E, the CCD line sensor 42B is provided at a downstream side of the CCD line sensor 42A.

As shown in FIGS. 6A through 6E, the distance of spacing between the CCD line sensors 42A, 42B is about two and a half times the length of an image recorded on the negative film 14 (i.e., the length thereof in the conveying direction of the negative film). In FIG. 6E, a dancer roller 98 is provided between the CCD line sensors 42A, 42B so as to be movable in the thickness-wise direction of the negative film 14. For this reason, when the negative film 14 passes through a region between the CCD line sensors 42A, 42B, an arc-shaped slack portion is formed in the negative film 14 due to the dancer roller 98 moving down lower than the conveying path. The slack portion can control the difference of the read rate between the CCD line sensors 42A, 42B. Further, by utilizing the slack portion, the image to be read by the CCD line sensor 42A is set as an image to be recorded three images after the image read by the CCD line sensor 42B.

For example, as shown in FIG. 6B, at the time when the leading image (A-1) is positioned at a read start position in the CCD line sensor 42B, when the negative film 14 is conveyed in a straight line, the CCD line sensor 42A is positioned on the image, A-3. Thereafter, by driving the dancer roller 98, the image, A-4 can be positioned at the read start position in the CCD line sensor 42A as shown in FIG. 6C.

Accordingly, when the slack portion is adjusted repeatedly by positional control of the dancer roller 98 each time three images are read by each of the CCD line sensors 42A, 42B from the above-described state, image reading processing can be efficiently effected by using two CCD line sensors 42A, 42B.

Further, as shown in FIG. 6A, the CCD line sensors 42A, 42B are each connected to a plurality of frame memories 46A, 46B, and 46C in which three images can be respectively stored, and the images read by each sensor in one rotation (reading of three images) are stored in the frame memories 46A, 46B, and 46C.

In the second embodiment, two CCD line sensors 42A, 42B are disposed along the conveying direction of the negative film. For this reason, there is no possibility that reading of images is effected in the order of the images being recorded on the negative film 14 and which image among images from A-1 to A-3 and which image among images from A-4 to A-6 are first read depends on the states of the images. The same operation applies correspondingly to the subsequent image reading for images of A-7 to A-9 and images of A-10 to A-12.

However, even in the above case, so long as the identification code is provided for each of the images as described in the first embodiment, the order of images being read from the frame memories 43A, 43B, and 43C which are respectively provided for the rows of negative films can be recognized and the images can be printed and discharged in order as recorded on the negative film 14.

Meanwhile, combination of the first embodiment and the second embodiment, namely, provision of a plurality of CCD line sensors 42A, 42B, . . . for each of the plurality of rows of negative films may be applied in such a manner that the images can be distributed easily and regularly for each of the rows by controlling the respective positions of the bins 92 in the sorter section 90 for each of the rows.

Further, in each of the above-described first and second embodiments, a single print section 70 is used for the developing device 10 in which a plurality of rows of negative films is processed, but a plurality of print sections may be respectively provided for the plurality of rows of negative films. In this case, it is effective that the number of print sections is the same as that of the rows of negative films to be processed in the developing device 10, but the number of print sections may be preferably made greater than that of the rows to be processed in the developing device 10 by one for emergency use.

What is claimed is:

1. An image processing apparatus which is equipped with a printer in which a plurality of original images recorded in an elongated member is recorded on a recording material, comprising:

a plurality of image readers which can read, as image data, the plurality of original images, respectively;

a plurality of memories provided such that at least one memory corresponds to each of said plurality of image readers, said plurality of memories each storing temporarily the image data read by a corresponding image reader;

image-data selection/readout means which selects one of said plurality of memories in accordance with a predetermined order irrespective of an order of the image data being read by said plurality of image readers and reads out the image data from the selected memory;

an image data supply controller which supplies, for the printer, the image data read out by said image-data selection/readout means; and a distributor which distributes, in a previously set order, recording materials printed by the printer based on the supplied image data.

2. An image processing apparatus according to claim 1, wherein said image-data selection/readout means is provided to select one of said plurality of memories on the basis of case information for specifying the elongated member and read out the image data from the selected memory, and said distributor is provided to distribute the printed recording materials for each case.

3. An image processing apparatus according to claim 1, wherein said image-data selection/readout means selects, on the basis of row information which specifies each of rows of said plurality of image readers, one of said plurality of memories and reads out the image data from the selected memory, and said distributor is provided to distribute the printed recording materials for each of the rows on the basis of the row information.

4. An image processing apparatus according to claim 1, wherein said plurality of image readers are disposed substantially in a straight line along a longitudinal direction of the elongated member conveyed in a row, and said image-data selection/readout means selects, every time reading of one image data by any one of said plurality of image readers is completed, a memory corresponding to the any one of said image readers, and reads out the one image data from the selected memory.

5. An image processing apparatus according to claim 1, wherein said distributor is provided to distribute the printed recording materials in an order of the plurality of original images being recorded in the elongated member.

6. An image processing apparatus according to claim 2, wherein said distributor is provided to distribute the recording materials, on which the plurality of original images are printed, in an order of these original images being recorded in the elongated member.

7. An image processing apparatus according to claim 3, wherein said distributor is provided to distribute the recording materials, on which the plurality of original images are printed, in an order of these original images being recorded in the elongated member.

8. An image processing apparatus according to claim 4, wherein said distributor is provided to distribute the recording materials, on which the plurality of original images are printed, in an order of these original images being recorded in the elongated member.

9. An image processing apparatus according to claim 1, wherein said plurality of image readers are disposed substantially in a straight line along a longitudinal direction of the elongated member and are provided to be able to read, as the image data, the original images of which number corresponds to at most the number of said plurality of image readers substantially simultaneously, and said image-data selection/readout means is provided to select one memory, corresponding to an order of the plurality of original images being recorded on the elongated member, from said plurality of memories, and reads out the image data from the selected memory.

10. An image processing apparatus according to claim 1, wherein said plurality of image readers are disposed in such a manner that one of said image readers corresponds to each row of a plurality of rows so that a plurality of elongated members can be processed in the plurality of rows, and said image-data selection/readout means selects, in an order of reading of any one of the plurality of original images by any one of the plurality of image readers being completed, a memory corresponding to the one image reader from said plurality of memories, and reads out the image data from the selected memory.

11. An image processing apparatus according to claim 10, wherein said distributor is provided to distribute the printed recording materials for each of the plurality of rows.

12. An image processing apparatus according to claim 10, wherein the printer is provided to correspond to each of the plurality of rows and the elongated member is printed by a corresponding printer among the printers respectively provided for the plurality of rows.

13. An image processing apparatus which is equipped with a printer in which a plurality of original images recorded in an elongated member along a longitudinal direction of the elongated member is moved along the longitudinal direction and is sequentially recorded in a recording material, comprising:

a plurality of image readers which can read, as image data, the plurality of original images, respectively;

a plurality of memories provided such that the number thereof coincides with that of said plurality of image readers, said plurality of memories each storing temporarily the image data read by a corresponding image reader;

image-data selection/readout means which selects and reads out the image data from said plurality of memories in accordance with a predetermined order irrespective of an order of the image data being read by said plurality of image readers;

an image data supply controller which supplies, for the printer, the image data read out by said image-data selection/readout means; and a distributor which cuts the recording material, on which images are printed by the printer on the basis of the supplied image data, for each of the printed images, and distributes the separate recording materials in a previously set order.

14. An image processing apparatus according to claim 13, wherein said plurality of memories each have a memory capacity of image data of one original image.

15. An image processing apparatus according to claim 13, wherein said plurality of image readers each include a CCD line sensor.

16. An image processing apparatus according to claim 13, wherein said plurality of image readers are disposed along a longitudinal direction of the elongated member so as to be able to read, as the image data, at least two original images among the plurality of original images on the elongated member.

17. An image processing apparatus according to claim 13, in which said plurality of original images are recorded on a plurality of elongated members, wherein said plurality of image readers are disposed apart from one another along a transverse direction of the plurality of elongated members so as to be able to concurrently read, as the image data, the original images from the plurality of elongated members.

18. An image processing apparatus according to claim 13, wherein said elongated member is a photographic film and said recording material is a photographic printing paper.

19. An image processing apparatus according to claim 13, wherein said distributor is provided to distribute the printed recording materials in an order of the plurality of original images being recorded in the elongated member.

20. An image processing apparatus according to claim 17, wherein said distributor is provided to distribute the printed recording materials in an order of the plurality of original images being recorded in the plurality of elongated members.

* * * * *